March 28, 1950      F. O. GRAY      2,501,771
REVERSIBLE HYDRAULIC TORQUE CONVERTER
Filed Dec. 3, 1948      3 Sheets-Sheet 1
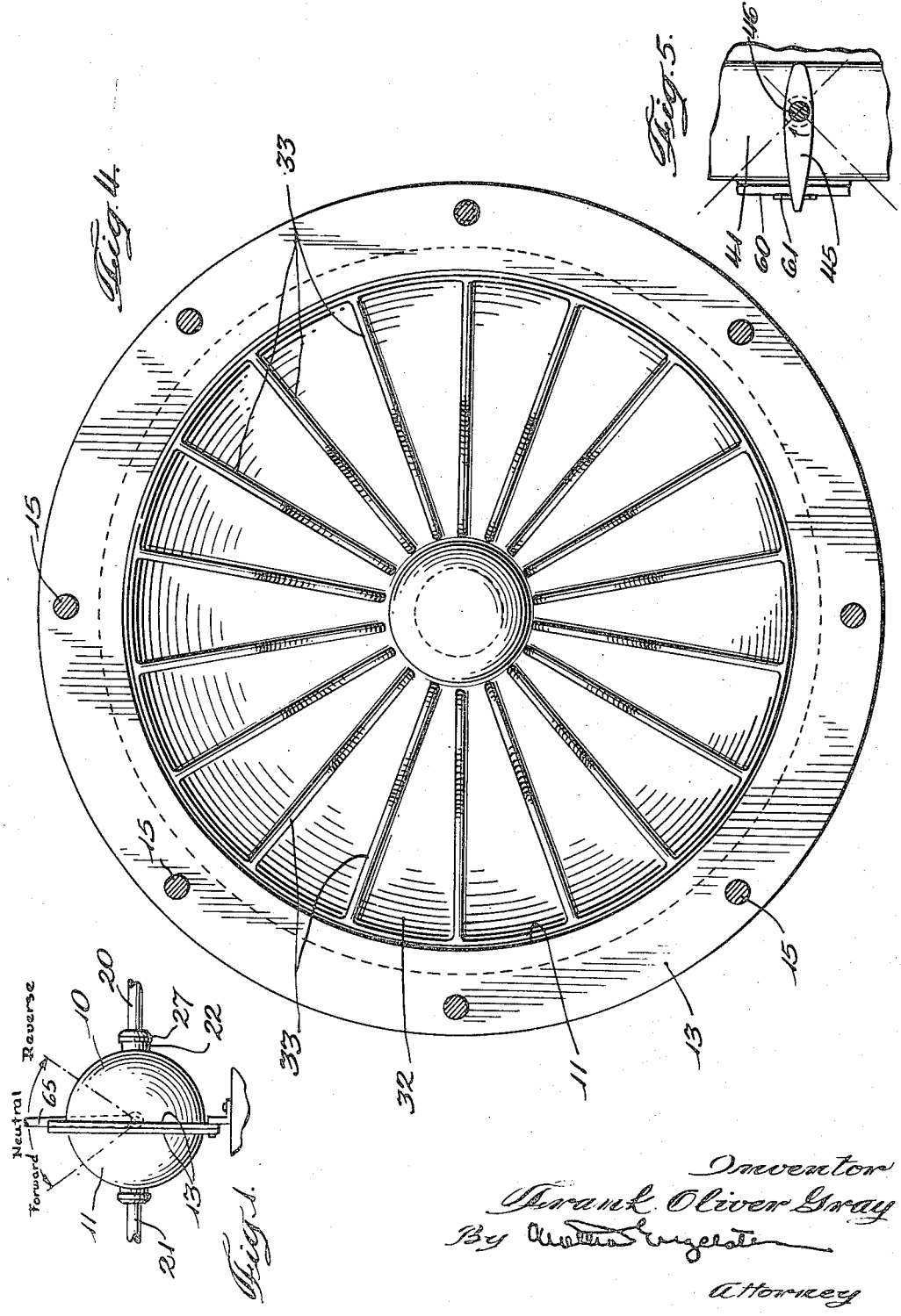
Inventor
Frank Oliver Gray
By
Attorney

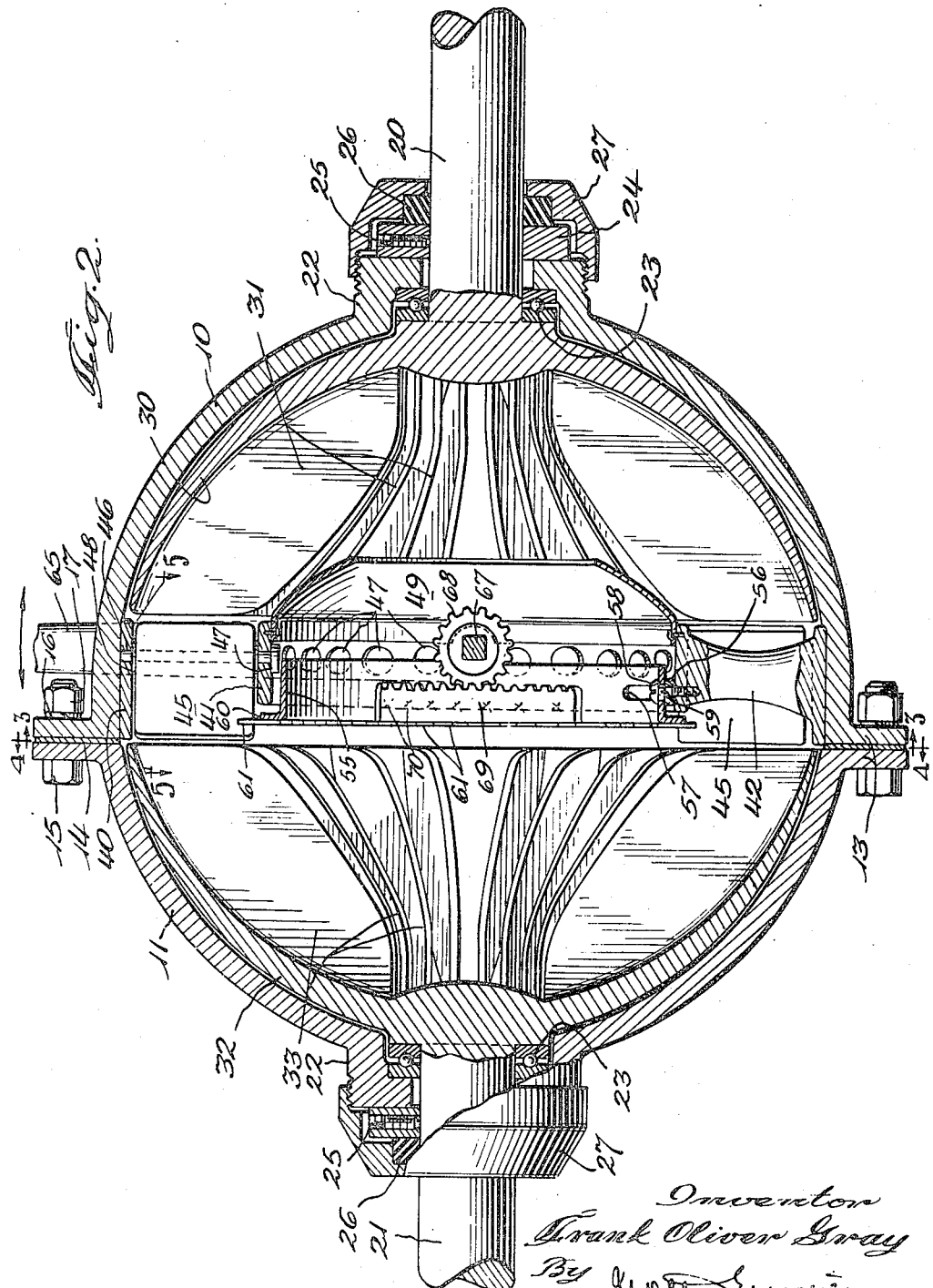

March 28, 1950          F. O. GRAY          2,501,771
REVERSIBLE HYDRAULIC TORQUE CONVERTER
Filed Dec. 3, 1948          3 Sheets-Sheet 3
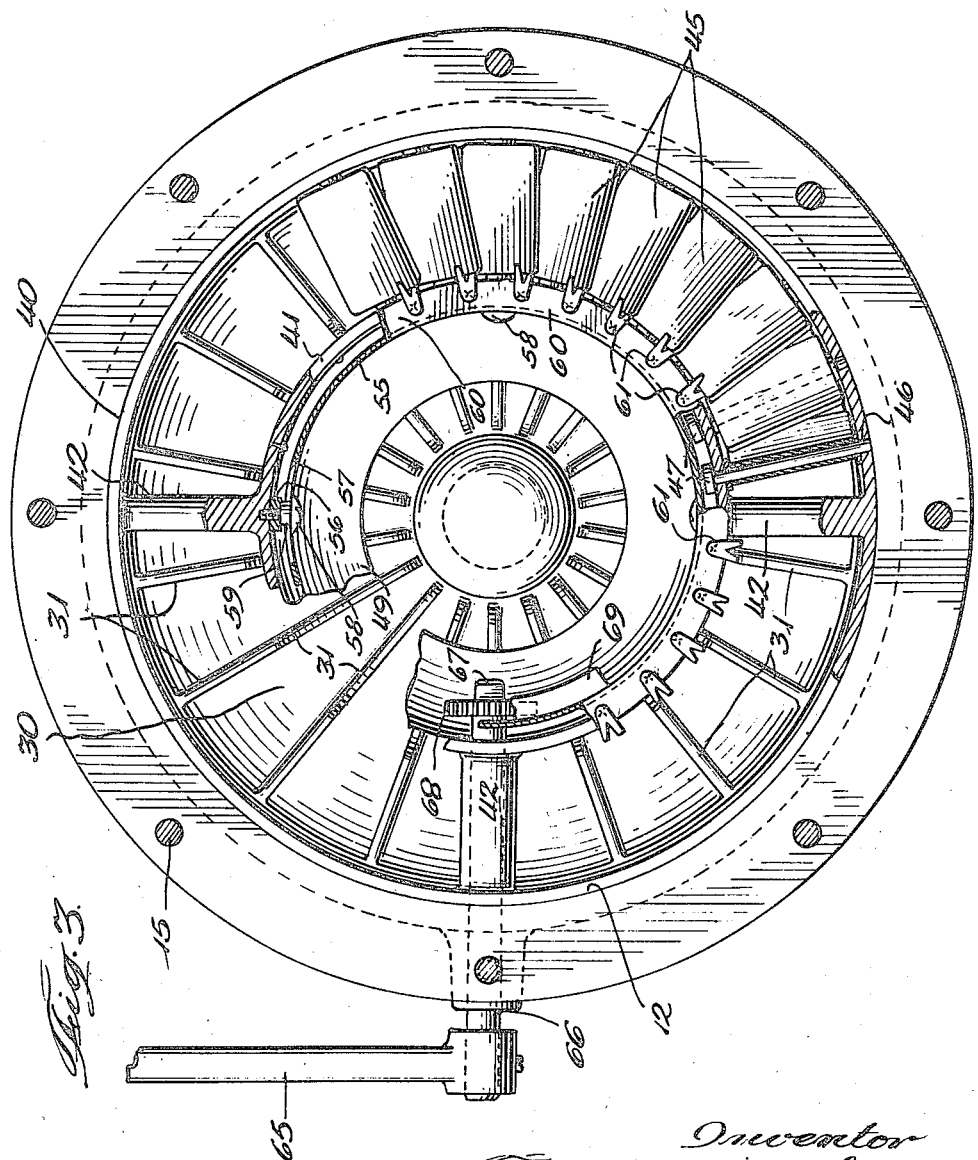

Patented Mar. 28, 1950

2,501,771

UNITED STATES PATENT OFFICE 2,501,771

REVERSIBLE HYDRAULIC TORQUE CONVERTER

Frank Oliver Gray, Chicago, Ill.

Application December 3, 1948, Serial No. 63,263

1 Claim. (Cl. 60—54)

My invention relates to apparatus designed for the transmission of power from a driving unit to a driven one, and is more particularly suited for motor car use as a replacement of the conventional transmission gearing.

One object of the invention is to provide a hydraulic drive which is built to transmit either forward or reverse motion without the use of an auxiliary or external gearing as a reversing medium.

A further object is to design a hydraulic drive capable of being reversed by the use of a single control lever.

Another object is to construct the novel transmission apparatus compactly and with its reversing mechanism fully encased and lubricated.

With the above objects in view, and any others which may suggest themselves from the description to follow, a better understanding of the invention may be had by reference to the accompanying drawings, in which—

Fig. 1 is a side elevation of the apparatus on a miniature scale;

Fig. 2 is a vertical section on a scale approaching full size;

Figs. 3 and 4 are, respectively, sections on the lines 3—3 and 4—4 of Fig. 2; and Fig. 5 is a detail section on the line 5—5 of Fig. 2.

Basically, the novel apparatus operates on the principle of conventional "fluid drive" transmissions. Thus, the housing of the apparatus is composed of a pair of substantially semi-spherical, cup-like sections 10 and 11 opening on each other, the section 10 being given extra depth by an extended wall portion 12. The rims of the latter and the section 11 are annularly flanged in closely-spaced relation, as indicated at 13, the flanges receiving a sealing gasket 14 between them; and the flanges are secured together tightly by a circular series of bolts 15 passing through them, the bolts receiving washers 16 and nuts 17.

The drive shaft 20 of the motor or other power source enters the housing section 10 at the center; and the driven shaft 21 leaves from the center of the section 11. The sections have hubs 22 which carry ball bearings 23 for the related shafts; and each hub receives a seal in respect to its shaft. Thus, the seal illustrated comprises a disc 24 made tight on the shaft by set screw 25, a packing ring 26 next outside the disc, and a clamping nut 27 for the ring threaded on the outer end of the hub 22. While this packing assembly is shown as a preferred one, or for purposes of illustration, it is apparent that any other packing unit may be used which is adaptable to the parts under consideration.

Inside the housing, the drive shaft 20 is expanded into the form of a cup 30 which is substantially semi-spherical and formed on the inside with a cluster of radial blades 31. The driven shaft 21 is similarly expanded with a cup 32 and a cluster of identical blades 33. Thus, when the housing contains hydraulic fluid, it may be generally assumed that the rotation of the drive shaft 20 will transmit rotation to the driven shaft 21 on the "fluid drive" principle. However, the transmitted rotation by the simple medium of the two sets of blades is always in one direction, that is, in the same direction as that of the drive shaft. The present invention therefore serves to interpose a mechanism between the two sets of blades 31 and 33 which makes it possible to obtain both the forward and reverse rotation of the driven shaft in relation to the forward rotation of the drive shaft.

Figs. 2 and 3 show that a band 40 is lodged in the entrance of the housing section 10, such band occupying a position between the edge portions of the shaft cups 30 and 32. Within the band 40 is a concentrically positioned ring 41; and the ring is rigidly spaced from the band by four webs 42, these being integral with the band and ring. A sturdy frame is thus formed in the center of the housing.

The frame just described is designed to form a carrier for a circularly-arranged series of vanes 45 positioned radially between the band 40 and the ring 41. The vanes normally occur in planes which pass through the axis of the housing; but they are radially pivoted on pins 46 in order to be swingable laterally in one or the other direction from their normal positions. The pins 46 are lodged in the band 40 and ring 41, having heads 47 inwardly of the ring and collars 48 inwardly of the band. Fig. 5 shows a top plan view of the uppermost vane 45 as normally positioned. When the drive shaft 20 is in rotation, it is apparent that the motive fluid merely passes through the spaces between the vanes without imposing rotative influence on the driven shaft 21; and a conical ring 49 is carried by the ring 41 on the driving side of the housing to deflect the motive fluid in the direction of the vanes 45. Now, in case the vanes are swung in unison, in the direction of the arrow in Fig. 5 to an angle while the drive shaft 20 is in rotation counter-clockwise in the Fig. 3 showing, the motive fluid will be deflected counter-clockwise and direct its pressure on the blades 33 of the driven shaft 21, so that the latter will turn in the same direction as the drive shaft. It follows, therefore, that the swinging of the vanes 45 in the opposite direction, the Fig. 3 position, will cause the shaft 21 to be driven in the reverse direction.

A mechanism for actuating the vanes 45 will now be described. It is noted that a ring 55 is positioned concentrically within the ring 41. The ring 55 is spaced from the ring 41 by washers 56 and formed with a circularly-spaced series of slots 57, these occurring opposite the web 42. A series of bolts 58 passes with neck portions 59 through the slots 57 and shanks through the washers 56 to thread into the webs 42, securing the ring 55 in place and with freedom for a partial amount of rotation, according to the length of the slots 57.

The ring 55 has an outward flange 60 which carries a series of marginal forks 61, these being welded to the flange 60. As shown in Fig. 3, the forks 61 straddle the inner edges of the vanes 45 at points distant from the pivot pins 46. Therefore, the turning of the ring 55 in either direction will swing the vanes 45 accordingly. The operation of the ring 55 is accomplished by an external hand lever 65 which is mounted on a rock shaft 66 journaled in one of the horizontal webs 42. The rock-shaft ends with a squared portion 67 alongside the ring 55. Mounted on the squared portion 67 is a spur gear 68 which meshes with a curved rack 69 welded to the ring 55 as indicated at 70.

It is now evident that the mechanism within the band 40 forms an intermediary between the driving and driven units of the transmission apparatus to train the motive fluid in directions opposite from the neutral zone and so procure either forward or reverse motion. While this is the basic principle of the mechanism, it is also apparent that the action of the vanes 45 as controlled by the hand lever graduates the force of the motive fluid, so that the greater the deviation of the vanes the greater and more direct the force exerted on the driven blades 33. This circumstance, coupled with the basic speed control accomplished by varying the speed of the drive shaft, renders the present apparatus a more effective and flexible hydraulic drive than the conventional one, as well as a hydraulic drive which is inherently reversible by the use of a simple external lever.

While I have described the invention along specific lines, various minor changes or refinements may be made therein without departing from its principle, and I reserve the right to employ all such changes and refinements as may come within the scope and spirit of the appended claim.

I claim:

A reversible hydraulic torque converter comprising in combination a rotary driving unit, having a set of circularly arranged blades, a driven unit having a set of circularly arranged blades in opposed relation and grouped with the driving unit, thereby adapting the driving blades to direct a fluid toward the driven blades, a frame between the blade sets defining an annular space, said frame consisting of an outer band with a concentrically positioned ring rigidly spaced from the band by webs integral with the band and ring, a series of circularly arranged vanes positioned radially between the band and the ring, radial pins lodged in the band and ring on which the vanes are mounted, thereby permitting lateral movement of the vanes, a second ring positioned concentrically within the first ring, said second ring having longitudinal slots therein and bolts passing through the slots into the first ring, thereby limiting the degree of rotation of the second ring, forks extending from the second ring and engaging the vanes so as to translate rotary motion of the second ring to lateral movement of the vanes, a rack mounted on the second ring, a rock-shaft having a gear thereon engaging the rack, a housing enclosing the entire structure, and a hand lever external of the housing for actuating the rock-shaft to induce rotation of the second ring.

FRANK OLIVER GRAY.

REFERENCES CITED

The following references are of record in the file of this patent:

UNITED STATES PATENTS

| Number | Name | Date |
| --- | --- | --- |
| 2,341,921 | Jandasek | Feb. 15, 1944 |
| 2,400,622 | Althoff | May 21, 1946 |